INVENTOR
HUGH V. MILNE
By Irwin S. Thompson
ATTY

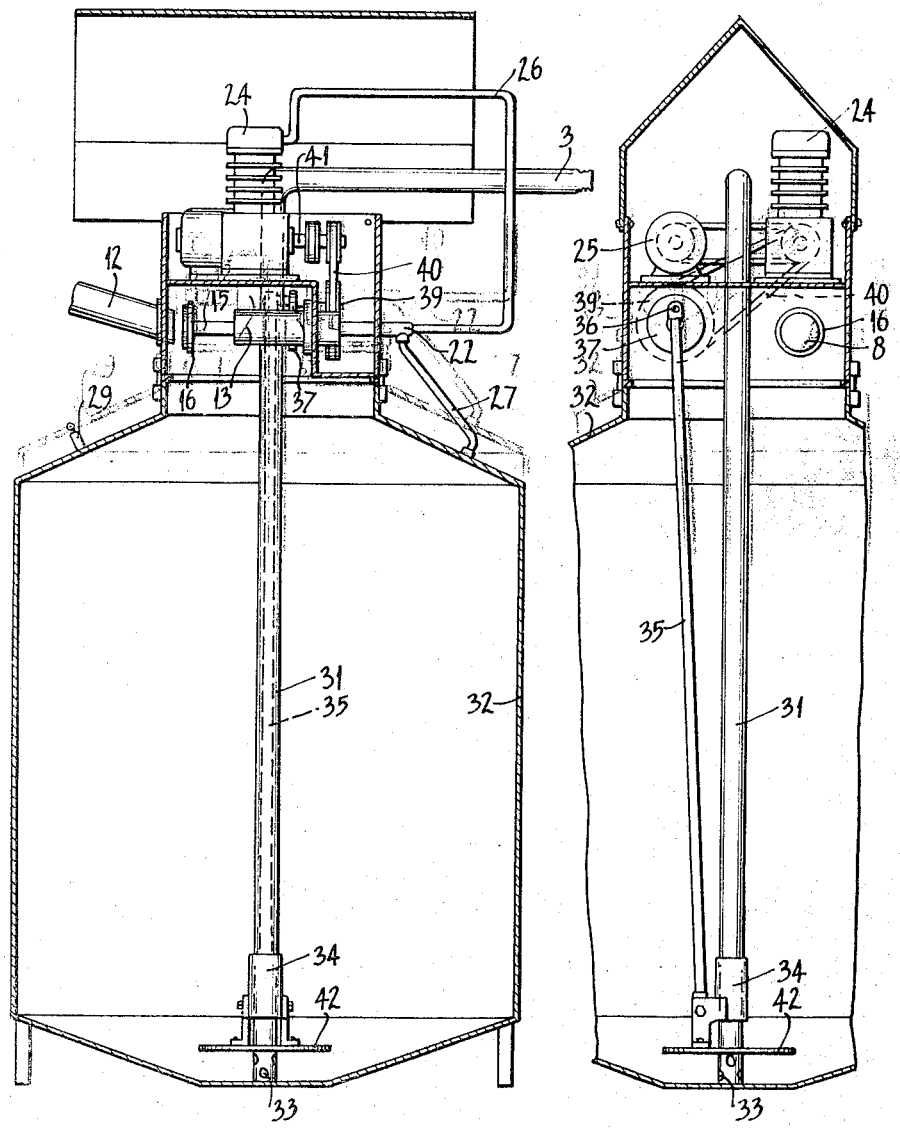

Jan. 24, 1967  H. V. MILNE  3,299,832
PUMPING APPARATUS
Filed Nov. 9, 1964  3 Sheets-Sheet 3
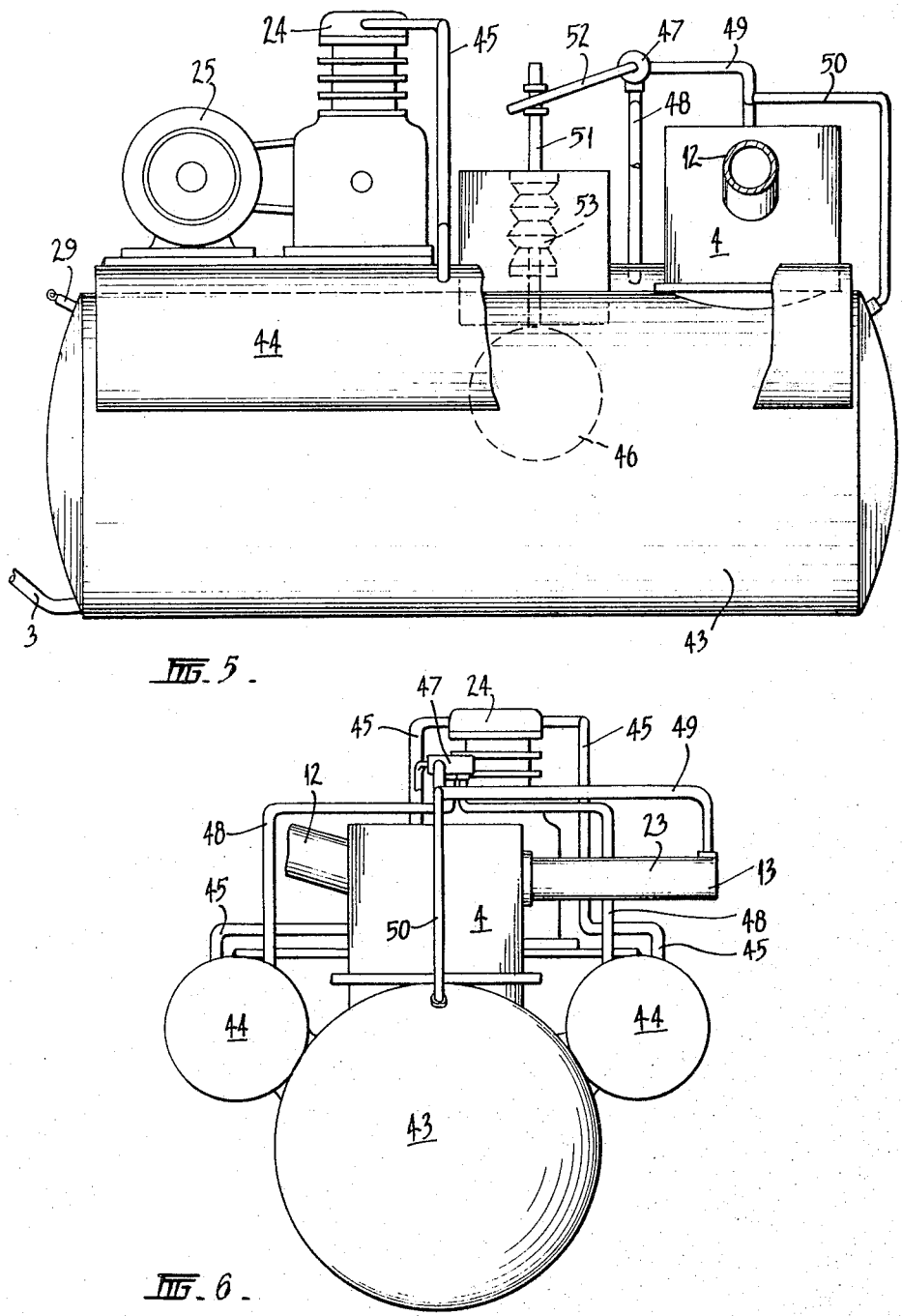
INVENTOR
HUGH V. MILNE
By Irwin S. Thompson
ATTY

United States Patent Office 3,299,832
Patented Jan. 24, 1967

3,299,832
PUMPING APPARATUS
Hugh V. Milne, Bendigo, Victoria, Australia, assignor to F. W. Milne & Son Proprietary Limited, Bendigo, Australia
Filed Nov. 9, 1964, Ser. No. 409,780
Claims priority, application Australia, Nov. 14, 1963, 37,657/63; Feb. 6, 1964, 40,601/64; Mar. 11, 1964, 41,870/64
9 Claims. (Cl. 103—234)

This invention relates to an improved pumping apparatus and to a valve for such apparatus and is particularly directed to a pump for disposal of liquid and semi-liquid materials, particularly manure.

For some time the disposal of manure in dairies has been generally unsatisfactory. Various regulations are provided which control dairies so that they are not a threat to public health but often the liquid manure washed from dairy floors is simply left lying about the entrances to the dairy or in any case closely adjacent to the dairy as a breeding ground for flies and to cause the conditions adjacent the dairy to be unsanitary.

This problem has been difficult to overcome because pumps provided for liquid manure have generally not been satisfactory in that they block when a large quantity of solid material is entrained in the manure or they are very difficult to clean, thus again being a possible source of contamination.

One main object of the present invention is to provide a pump apparatus which is capable of handling materials such as liquid manure and a further object is to provide an automatic valve for such apparatus.

Broadly, the invention includes in combination a tank adapted to receive the material to be pumped, the tank having an inlet at the upper surface thereof and an outlet opening adjacent the lower surface thereof, valve means adapted to close the inlet and a source of high pressure fluid which can be applied to the tank to thereby pressurize the tank and cause the contents thereof to be passed through the outlet.

Preferably the valve means on the inlet line comprises an automatic valve which, under normal conditions, is open to permit the material to be pumped to readily enter the tank which valve means, at the commencement of the pressurization of the tank, closes automatically to thereby permit the tank to be pressurized.

The fluid used to empty the tank of its contents is preferably air so that at the completion of the pumping operation the tank is emptied and is ready to receive a further quantity of material to be pumped.

The invention also includes a valve having a valve seat and a valve closure member which member is so biased as to be normally held away from the seat and which closure member has attached thereto or associated therewith a fluid tight compartment which is adapted to be connected to a source of pressure fluid, the fluid causing the valve closure to be moved to be brought into contact with the seat to thereby close the valve.

In one preferred form the valve closure member is mounted on a shaft which is journalled for longitudinal movement towards or away from the valve seat, the shaft being provided on the side of the journal away from the seat with a helical spring or the like adapted to move the closure from the seat and the shaft having at its end away from the seat means whereby it forms a fluid tight seal within a cylinder which cylinder is adapted to be connected to a source of pressure fluid.

In operation the valve closure is connected with a tank or the like which is adapted to be pressurized so that on pressurization of the tank the valve closure is retained against the seat by the pressure in the tank.

In one specific form of pumping apparatus the outlet opening comprises a hollow tube extending downwardly into the tank which tube has its lower end closed and at least one aperture in the side thereof.

Mounted about the tube is an agitator plate which is movable along the tube so as to pass over the aperture in the tube and ensure that this is not blocked by foreign matter.

In one specific form this agitator plate is mounted on or adjacent a collar which fits about the outlet tube and which is attached to means whereby the collar is reciprocated thus causing reciprocation of the agitator plate over the aperture in the side of the outlet tube.

In some applications the outlet tube may have a pair of diametrically opposed apertures over both of which the agitator plate passes on each reciprocation. The reciprocation of the agitator plate or collar may be by a connecting rod which is pivotally connected to a crank which is either directly or indirectly driven by an external power source. The power source may be the motor of the compressor unit, if desired.

In one specific form of the invention there is provided in combination a tank adapted to receive the material to be pumped, an inlet at the upper surface thereof and an outlet at or adjacent the lower surface thereof, valve means adapted to close the inlet, a storage for high pressure fluid, there being provided within the tank a valve which is actuated by the level of the material to be pumped which valve causes the release of the high pressure into the tank, the entrance of said high pressure fluid automatically closing the inlet. The valve means operated by the level of the material may preferably comprise a float valve which is provided with means whereby it is retained in its up position whilst the tank is pressurized thus permitting the high pressure fluid to pass into the tank without restriction.

In order that the invention may be more readily understood three embodiments of pump assembly made in accordance with the invention will now be described with reference to the accompanying drawings in which:

FIGURE 3 is an elevation partly in section of a second type of pump assembly having a vertically disposed outer pipe;

FIGURE 4 is a broken elevation of the assembly shown in FIGURE 3, but taken at right-angles to the view of FIGURE 3;

FIGURE 5 is a partial side elevation of a still further form of pump assembly which is also partially broken away; and FIGURE 6 is an end elevation of the assembly shown in FIGURE 5.

Figure 1:
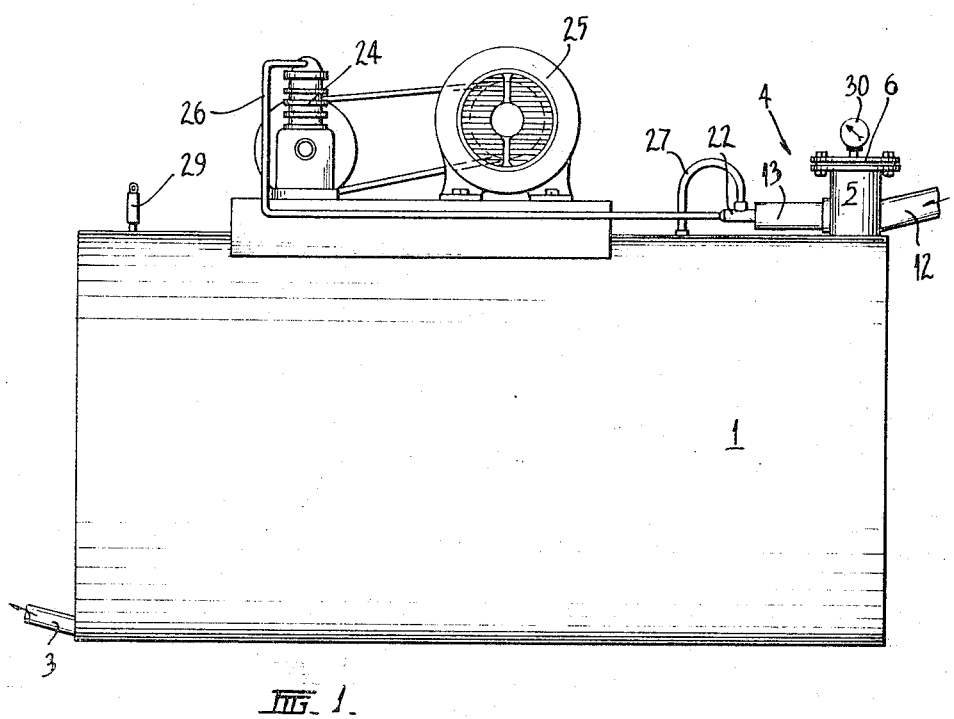
FIGURE 1 is a side elevational view showing the arrangement of the components of the first embodiment.
Figure 2:
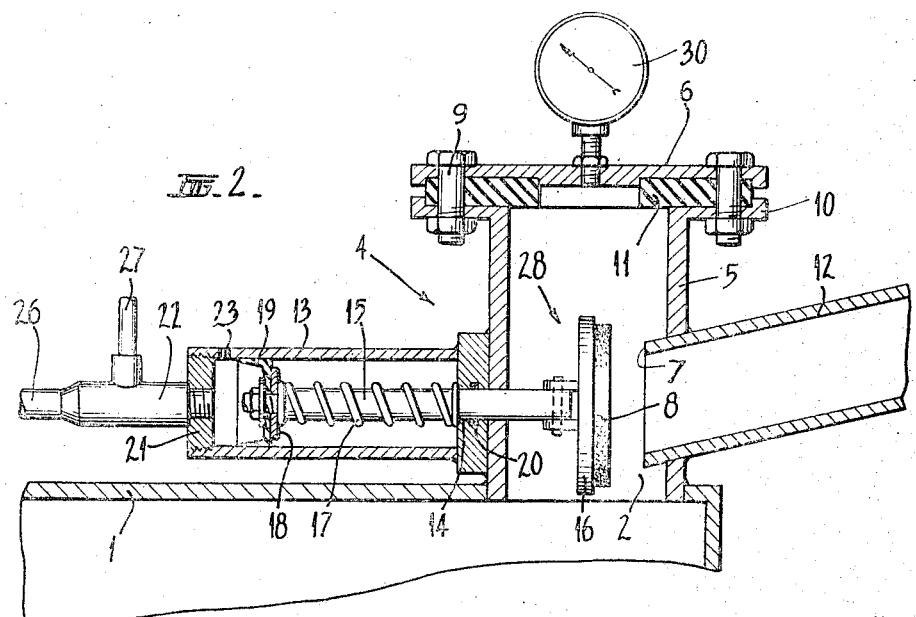
FIGURE 2 is an enlarged sectional view of valve assembly shown in FIGURE 1.

The apparatus illustrated in FIGURES 1 and 2 comprises a tank 1 which in one practical form is a welded metal tank of some 300 gallons capacity which has an inlet opening 2 on its upper surface and an outlet opening 3 adjacent its lower surface at one end. The tank, when positioned, is preferably provided with a slight downward slope towards the outlet 3 so that all material in the tank may be expelled therefrom through the outlet and is also positioned so the inlet 2 is at such a level that material to be passed to the tank may be passed thereto under gravity.

In one particular application of the unit where it is to be used to remove liquid manure from dairies the liquid inlet 2 is in connection with the drains in the dairy, not illustrated, through which pass the manure either directly or when the dairy floor is hosed or otherwise cleaned.

Mounted on the tank and in connection with the inlet 2 is a valve 4 which may, if required, be a manually operated valve, but is preferably an automatic valve.

The valve 4 comprises a body 5 which is cylindrical in form having one end connected to the tank and having a removable cover 6 at the other end which cover is adapted to provide access to a valve seat 7 and valve face 8. As illustrated the cover 6 is attached to the body 5 by means of bolts 9 which pass through the cover and a flange 10 on the body. A gasket 11 is provided to ensure a seat is formed. An inlet pipe 12 passes through the wall of the cylindrical body member 5 and is preferably slightly downwardly directed to ensure that any liquid in the inlet pipe enters the body of the valve from which it flows into the tank through the inlet 2.

Mounted on the valve body 5 opposite the inlet pipe 12 is a metallic cylinder 13 which is in connection with the body of the valve by means of an aperture 14 which acts as a journal for the stem 15 which is adapted for longitudinal movement.

Pivotally connected to the valve stem 15 within the body is a valve closure member 16 which carries the face 8 which may be of rubber or other similar material. This closure member 16 is adapted to co-operate with the inner end of the inlet pipe 12 which forms the valve seat 7 and which is preferably formed at right angles to the valve stem. The pivotal connection enables the closure member 16 to compensate for irregularities in the valve seat 7.

Fitted over the valve stem 15 within the cylinder 13 is a helical spring 17 which tends to move the valve closure 16 away from the valve seat 7 to thereby permit free access through the inlet pipe 12. This spring 17 is preferably connected between the surround of the aperture 14 and a collar 18 fitted to the end of the valve stem 15.

Also fitted to the end of the valve stem 15 is a cup washer 19 having its flange extending rearwardly towards the end of the cylinder away from the valve body, which cup washer 19 makes a fluid tight seal with the cylinder 13.

An O-ring 20, for example, of neoprene, is provided in the aperture 14 to prevent any fluid passing from the cylinder to the body or vice versa. The end of the cylinder away from the body is closed by a plug 21 which has a connector 22 therein by means of which pressure air may be fed to the cylinder 13. The cylinder 13 is also provided with a bleed hole 23 which will be described more fully hereinafter.

Provided on the tank 1 is an air compressor unit 24 which is driven either by an electric motor 25 or an internal combustion engine as required.

The outlet pipe 26 of this air compressor 24 is connected to the connector 22 and thus to cylinder 13 of the automatic valve and by way of pipe 27 to the tank itself. In practice it has been found that the connection from the compressor to the valve can be of slightly larger diameter than that from the compressor to the tank although this is not essential.

The compressor 24 may be provided with an automatic cut out which can be set as will be described hereafter.

In use the pump is not touched during the milking operation although during this time liquid and manure may well enter the tank as the valve will be in its open position, as illustrated, which permits ready flow of fluid manure from the inlet pipe 12 to the tank 1.

After milking when the dairy is washed out further material enters the tank and when the drains in the dairy are empty and the tank has received all of the material to be removed, the compressor unit 24 is started. The pressure air is passed to the body of the tank 1 and to the cylinder 13 of the automatic pump and because the diameter of the pipe connection with the cylinder is larger than that to the tank there is a pressure build up and the valve stem 15 is moved against the spring 17 which holds it in the open position and the closure member 16 moves against the valve seat 7 thus forming a seal between the face 8 and the seat 7, the tank thus becoming a vessel which can be pressurized.

After the completion of the movement of the valve stem the main portion of the air from the compressor passes directly into the tank 1 and the pressure in the tank starts to increase.

At the same time pressure is applied automatically to the inner face 28 of the valve closure 16 as this is in connection with the body of the tank and thus, when this pressure build up commences, the valve is held closed regardless of the action of the pressure air in the cylinder.

As the pressure builds up the liquid manure is forced through the outlet 3 and any piping attached thereto so that pressure equalization is achieved and in this way the manure passes from the outlet to a delivery position which may be some distance from the dairy. This action continues until all material in the tank has been passed through the outlet and through the pipes connected thereto. At this time the pressurization becomes low, except for a slight pressure due to friction of the air passing through the pipes. If the compressor is stopped there will be an air leak both through the outlet pipe and through the bleed 23 in the cylinder which leak continues until the fluid pressure on the cup washer 19 and the face 28 of the valve closure 16 is less than the pressure applied by the spring 17 in the cylinder and the valve will assume its open position thus readying the pump for a further operation.

It can be seen that as the quantity of manure and water will be relatively constant at successive milkings, an automatic cut off, not illustrated, on the compressor can be set to ensure that all the material will be removed and the pump can be left to turn itself off after the farmer has left the dairy.

It can be noted that using the pump of the present invention the manure can be delivered at a relatively great distance from the dairy and this will normally be done by the use of flexible surface piping such as polyethylene piping, and use can be made of the manure as a fertilizer as this piping can be readily shifted at required periods.

Also it can be seen that the unit of the invention is relatively self-cleaning as it is totally emptied on each use although if desired it can at various periods be partially filled with, say, a water disinfectant mixture which can then be pumped through the unit to clean the inlet pipes, the valve, the tank and the outlet pipes.

To ensure complete safety of operation a safety valve 29 is fitted either to the tank, as illustrated, or to the automatic cut off valve.

In one specific form a safety valve having a release pressure of 25 lbs. per square inch has been used on a pump which normally operates between 15 and 18 lbs. per square inch. This gives a sufficiently great safety margin to prevent any possible damage to the tank. As illustrated there is provided a pressure gauge 30 to enable supervision of this pressure.

In a modified form of the invention illustrated in FIGURES 3 and 4 the outlet opening comprises an outlet pipe 31 which is closed at its lower end which is positioned adjacent the floor of the tank 32 which is vertically arranged and which pipe 31 has a set of apertures 33 therein by means of which the contents of the tank may enter the outlet pipe 31 when pressure is applied to the pump and the valve on the outlet pipe if any, is open.

Mounted about the outlet pipe 31 is a sleeve or collar 34 which is a sliding fit thereon and which in turn is connected by means of the connecting rod 35 to a crank pin 36. This crank pin 36 is mounted on a pulley 37 which is on a shaft which extends through a wall 38 of the tank 32. This shaft is driven by a pulley 39 which is driven by a belt 40 which is driven by a shaft 41 which is an extension of the shaft of the compressor 24 which is in turn driven from a motor 25.

Mounted below the collar 34 is an agitator plate 42 which has a central aperture slightly larger than the external diameter of the outlet pipe 31 and which thus extends outwardly therefrom.

This agitator plate 42 may be of any desired shape but in practice a rectangular plate has been used. Rotation of the pulley 37 causes reciprocation of the connecting rod 35 and thus of the collar 34 and the agitator plate 42.

The agitator plate 42 is so positioned that at the lower end of its movement, not illustrated, it passes over the apertures 33, in the outlet pipe 31 and at the upper end of its movement, as illustrated, the agitator plate is above these apertures.

This agitator 42 serves two purposes. Firstly, should any solid matter be caught in any of the apertures 33 in the outlet pipe this will be quickly and efficiently broken away from the agitator plate, thus keeping the apertures clear and permitting the pump to operate efficiently.

Secondly, the agitation caused in the body of the tank ensures that solid matter remains entrained in the liquid matter and does not settle at the bottom of the tank from whence it may not be pumped and delivered through the outlet pipe.

In one practical form the agitator plate is operated at approximately 200 strokes per minute and this has been found to be entirely satisfactory although variations in this speed may be made if desired.

It can be seen that the tank 31 is different in shape to the tank 1 previously described and the orientation of the parts of the valve 4 have been altered, the cylinder 13 being positioned within the tank but the operation of this form of pump is identical to the previous form except that the agitator plate 42 is driven as described.

A modified form of the apparatus which is suitable for use with a smaller volume tank will now be described with reference to FIGURES 5 and 6 of the drawings.

This form of apparatus has been working satisfactorily with a 20 gallon tank 43 rather than a tank having a capacity of the order of 300 gallons which is a suitable size for the earliest embodiments.

In this embodiment, there is provided a motor 25 and compressor 24 mounted on the tank and a pair of air tanks 44 in connection with the compressor 24 by pipes 45.

The inlet valve 4 which controls the flow of material into the tank apparatus is the same as the previously described valve, except that it is automatically actuated by the level of matter in the tank.

In this specific form this actuation is by means of a float valve having a ball 46 which is raised as material enters the tank until at a predetermined height it opens the valve 47. This valve is connected between pipes 48 connected to the air tanks 44 and pipe 49 connected to the inlet valve 4 and which pipe 49 is connected to pipe 50 which is in connection with the tank 43. The valve 47 thus permits the high pressure air from the tanks 44 to close the inlet valve 4 and to enter the tank 43 causing the material in the tank to pass through the discharge opening. The ball 46 is connected to a shaft 51 which actuates a member 52 which causes the operation of the valve 47. The shaft 51 is provided with a trumpet washer 53 which, provided the interior of the tank is pressurized, prevents the ball 46 from dropping as material leaves the tank.

The operation of this modification is as follows. The motor 25 is started, actuating the compressor 24, and pressure is built up in the air tanks 44 until these reach a predetermined pressure at which time the compressor ceases operation. Material flows into the tank via the inlet pipe 12 and the inlet valve 4 and the ball 46 rises. When the ball reaches its predetermined height it actuates a valve 47 which connects the high pressure air in the air tanks 44 to the inlet valve 4 and to the tank 43. The air passing to the inlet valve causes this to close as described with relation to the earlier embodiments and the pressure in the tank causes the material to pass through the discharge outlet.

The trumpet washer 53 maintains the ball 46 in its raised position as long as the tank remains pressurized, thus permitting the further flow of air from the air tanks 44 to the tank 43 containing material. When all the material in the tank has passed to discharge, the pressure within the tank drops to atmospheric pressure, the trumpet washer no longer retains the ball in its raised position and this drops, preventing pressure air passing from the air tanks 44 to the inlet valve 4 and the tank. The inlet valve is thereby allowed to open and further material may pass into the tank and, at the same time, the compressor may commence operation or may already have commenced operation when the pressure in the air tank or tanks drops below a predetermined value. Thus a cycle has been completed automatically and the apparatus can continue to operate as long as material passes to the inlet valve and the ball is caused to rise.

I claim:

1. A pump including a tank to receive material to be pumped, an inlet at the top of the tank, an outlet comprising a pipe which extends into the tank and terminates adjacent the lower surface thereof, the pipe having an aperture adjacent the lower end thereof, a movable plate positioned over the end of the pipe, means to reciprocate the plate over the aperture, automatic valve means having a valve member adapted to close the inlet, a source of high pressure air which can be selectively applied to the tank, and means operated by the pressure air for operating the automatic valve means whereby the valve member closes the inlet and the tank is pressurized.

2. A pump including a tank, an inlet pipe in the top of the tank, an outlet comprising a pipe which extends into the tank and terminates adjacent the lower surface thereof, the pipe having an aperture adjacent the lower end thereof, a movable plate positioned over the end of the pipe, means to reciprocate the plate over the aperture, valve means mounted adjacent the termination of the inlet pipe and having a cylinder with its axis coaxial with the termination of the inlet pipe, a piston mounted within the cylinder and having a closure member actuated thereby outside the cylinder, adjacent the termination of the inlet pipe and within the tank, spring means to bias the closure member away from the inlet pipe, a source of high pressure air comprising a compressor having a motor, means for selectively applying said high pressure air to the tank and to the cylinder, and means to drive said reciprocating means from the compressor motor.

3. A pump including a tank to receive material to be pumped, an inlet at the top of the tank, an outlet comprising a pipe which extends into the tank and terminates adjacent the lower surface thereof, the pipe having an aperture adjacent the lower end thereof, a movable plate positioned over the end of the pipe, a collar positioned around the pipe and to which the plate is attached, the collar being movable along the pipe, a crankpin within the tank and attached to the collar, means to reciprocate the crankpin, automatic valve means having a valve member adapted to close the inlet, a source of high pressure air, means for selectively applying said high pressure air to the tank, and means operated by the pressure air for operating the automatic valve means whereby the valve member closes the inlet and the tank is pressurized.

4. A pump including a tank to receive material to be pumped, an inlet at the top of the tank, an outlet comprising a pipe which extends into the tank and terminates adjacent the lower surface thereof, the pipe having an aperture adjacent the lower end thereof, a movable plate positioned over the end of the pipe, a collar positioned around the pipe and to which the plate is attached, the collar being movable along the pipe, a crankpin within the tank and attached to the collar, means to reciprocate the crankpin, automatic valve means having a valve member adapted to close the inlet, a motor and compressor assembly outside the tank to supply pressure air to the tank, and means operated by the pressure air for operating the automatic valve means whereby the valve member closes the inlet and the tank is pressurized.

5. A pump including a tank, an inlet pipe in the top of the tank, an outlet comprising a pipe which extends into the tank and terminates adjacent the lower surface thereof, a pipe having an aperture adjacent the lower end thereof, a movable plate positioned over the end of the pipe, a collar positioned around the pipe and to which the plate is attached, the collar being movable along the pipe, a crankpin within the tank and attached to the collar, means to reciprocate the crankpin, valve means mounted adjacent the termination of the inlet pipe and having a cylinder with its axis coaxial with the termination of the inlet pipe, a piston mounted within the cylinder and having a closure member actuated thereby outside the cylinder, adjacent the termination of the inlet pipe and within the tank, spring means to bias the closure member away from the inlet pipe, a motor and compressor assembly outside the tank to apply pressure air to the tank and to the cylinder, and means to drive the crankpin from the compressor motor.

6. A pump including a tank to receive material to be pumped, an inlet at the top of the tank and an outlet adjacent the lower surface of the tank, valve means for closing the inlet, a float in the tank, a source of pressure air, a valve for admitting said pressure air to the tank to raise the pressure in the tank and to maintain said inlet valve closed, means actuated by the float for opening said pressure air valve when the float is in an upward position thereby to raise the pressure in the tank, and means maintaining the float in raised position while the pressure in the tank is elevated.

7. A pump as claimed in claim 6, said means to maintain the float in raised position comprising a bellows surrounding a shaft connected to the float, the bellows being connected to an internal wall of the tank.

8. A pump including a tank adapted to receive material, an inlet into the top of the tank with which is associated a valve, an outlet opening adjacent the bottom of the tank, storage means for high pressure fluid, means whereby the fluid can be supplied to the interior of the tank, a float-operated valve means which is connected between the fluid storage means and the tank and inlet valve, the inlet valve having a closed cylinder to receive pressure fluid and thereby close the inlet valve, the float having means whereby it is retained in elevated position while the tank is pressurized.

9. A pump according to claim 8 wherein the means to retain the float in elevated position comprises a bellows surrounding a shaft to which the float is connecting and connected to an internal wall of the tank.

References Cited by the Examiner
UNITED STATES PATENTS

| | | | |
|---|---|---|---|
| 1,473,958 | 11/1923 | Johnson | 103—234 |
| 1,492,171 | 4/1924 | Jennings | 103—234 |
| 1,922,911 | 8/1933 | Farmer | 251—62 |
| 1,995,561 | 3/1935 | Belanger et al. | 251—62 |
| 2,141,427 | 12/1938 | Bryant | 103—235 |
| 2,703,961 | 1/1956 | Yeomans | 103—246 |
| 2,976,814 | 3/1961 | Ver Planck et al. | 103—235 |

DONLEY J. STOCKING, *Primary Examiner.*

MARTIN P. SCHWADRON, *Examiner.*

W. J. KRAUSS, *Assistant Examiner.*